United States Patent
Aida

(10) Patent No.: US 7,205,341 B2
(45) Date of Patent: Apr. 17, 2007

(54) AQUEOUS PIGMENT DISPERSION, INKJET INK, AND PROCESS FOR PRODUCING AQUEOUS PIGMENT DISPERSION

(75) Inventor: Seiji Aida, Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 323 days.

(21) Appl. No.: 10/646,820

(22) Filed: Aug. 25, 2003

(65) Prior Publication Data

US 2004/0068030 A1   Apr. 8, 2004

(30) Foreign Application Priority Data

Aug. 29, 2002  (JP) ............................ P2002-251378
Aug. 29, 2002  (JP) ............................ P2002-251379

(51) Int. Cl.
C09D 11/02 (2006.01)
C08F 267/04 (2006.01)

(52) U.S. Cl. ............ 523/160; 523/161; 524/811; 524/854; 525/285; 525/301; 525/303; 525/309

(58) Field of Classification Search ............ 523/160, 523/161; 524/811, 854
See application file for complete search history.

(56) References Cited

U.S. PATENT DOCUMENTS

| | | | | |
|---|---|---|---|---|
| 4,810,612 A | * | 3/1989 | Ueda et al. | ............ 430/109.31 |
| 5,310,806 A | * | 5/1994 | Wild et al. | .................. 525/285 |
| 5,814,685 A | * | 9/1998 | Satake et al. | ................ 523/201 |
| 5,954,866 A | * | 9/1999 | Ohta et al. | ................ 106/31.89 |
| 6,433,039 B1 | * | 8/2002 | Schwarz | ..................... 523/161 |
| 6,451,919 B1 | * | 9/2002 | Aglietto et al. | ............. 525/285 |
| 6,841,592 B2 | * | 1/2005 | Nadolsky | ..................... 523/160 |
| 6,890,378 B2 | * | 5/2005 | Yatake et al. | ............ 106/31.59 |
| 2004/0249014 A1 | * | 12/2004 | Williams et al. | ............ 522/113 |

FOREIGN PATENT DOCUMENTS

| | | |
|---|---|---|
| JP | 50-49004 | 5/1975 |
| JP | 53-61412 | 6/1978 |
| JP | 54-89811 | 7/1979 |
| JP | 55-65269 | 5/1980 |
| JP | 56-57862 | 5/1981 |
| JP | 57-36692 | 2/1982 |
| JP | 59-20696 | 2/1984 |
| JP | 59-146889 | 8/1984 |

* cited by examiner

*Primary Examiner*—Callie Shosho
(74) *Attorney, Agent, or Firm*—Oblon, Spivak, McClelland, Maier & Neustadt, P.C.

(57) ABSTRACT

The present invention relates to an aqueous pigment dispersion that shows excellent dispersibility and storage stability, an inkjet ink that shows excellent jetability, water resistance, and adhesion, and a process for producing an aqueous pigment dispersion that shows excellent dispersibility and storage stability, as well as superior jetability, water resistance and adhesion. An aqueous pigment dispersion of the present invention comprises a dispersion formed by dispersing a monoalkyl maleate graft polymer of a maleic anhydride/α-olefin copolymer in water in the presence of a base, a pigment, and an aqueous medium.

17 Claims, No Drawings

AQUEOUS PIGMENT DISPERSION, INKJET INK, AND PROCESS FOR PRODUCING AQUEOUS PIGMENT DISPERSION

BACKGROUND OF THE INVENTION

1. Field of the Invention

The present invention relates to an aqueous pigment dispersion that shows excellent dispersibility and storage stability, which when used as an inkjet ink, offers superior jetability (discharge characteristics), water resistance and adhesion. Furthermore, the present invention also relates to an aqueous inkjet ink that shows excellent storage stability, jetability, water resistance, and adhesion. In addition, the present invention also relates to a process for producing an aqueous pigment dispersion for use as an inkjet ink that shows excellent dispersibility and storage stability, as well as superior jetability, water resistance and adhesion.

2. Description of the Related Art

Currently, solutions of water-soluble dyes such as acid dyes, direct dyes and basic dyes in a glycol based solvent and water are widely used as inkjet inks (Japanese Laid-open publication (kokai) No. Sho 53-61412, Japanese Laid-open publication (kokai) No. Sho 54-89811, and Japanese Laid-open publication (kokai) No. Sho 55-65269). In order to ensure good ink stability, water soluble dyes that show good solubility in water are the most commonly used dyes. However, as a result of this solubility, inkjet inks typically show poor water resistance, and if water is spilt on a printed image, the dyes within the printed areas tend to bleed very easily.

In order to try and alleviate this type of poor water resistance, investigations have been conducted into changing the dye structure, and preparing strongly basic inks (Japanese Laid-open publication (kokai) No. Sho 56-57862). Other research has been conducted into improving the water resistance by effectively utilizing the reaction between the recording paper and the ink (Japanese Laid-open publication (kokai) No. Sho 50-49004, Japanese Laid-open publication (kokai) No. Sho 57-36692, Japanese Laid-open publication (kokai) No. Sho 59-20696, Japanese Laid-open publication (kokai) No. Sho 59-146889). These methods produce remarkable effects for special recording papers, but lack flexibility, as they restrict the types of recording media that can be used, and when media other than the special recording paper are used, a recorded image of satisfactory water resistance can often not be produced using inks that use water soluble dyes.

Furthermore, although water resistant inks produced either by dispersing or dissolving an oil soluble dye in a high boiling point solvent, or by dissolving an oil soluble dye in a volatile solvent do exist, such inks are environmentally undesirable due to problems associated with solvent odors and solvent discharge. In addition, in cases of large volume print recording, or in other cases depending on the location of the printing device, the solvent may need to be recovered, which is difficult. As a result of the above issues, the development of inkjet inks comprising a pigment dispersed in a water-based medium is being actively pursued as a way of improving the water resistance of the recorded product.

However, pigments differ from dyes in that they are insoluble in the recording media, and dispersing fine particles of pigments, and maintaining such dispersions in a stable state, has proven extremely difficult. In addition, as the resolution of printers has increased, leading to finer nozzle diameters, the particle size of colorants within inkjet inks has needed to be reduced even further. This additional reduction in particle size has made it even more difficult to maintain inks in stable dispersions. Further improvements are needed in order to harness the inherent advantages that pigments offer over dyes in terms of water resistance and light fastness, while seeking performance at least equal to, and preferably superior to dyes in terms of other sought-after characteristics such as ink discharge properties, long term storage stability, adhesion to recording media such as paper, image color, and bleeding.

SUMMARY OF THE INVENTION

An object of the present invention is to provide an aqueous pigment dispersion with excellent dispersibility and storage stability. Furthermore, another object of the present invention is to provide an aqueous inkjet ink that shows superior storage stability, discharge characteristics, water resistance and adhesion. Yet another object of the present invention is to provide a process for producing an aqueous pigment dispersion that shows excellent dispersibility and storage stability, and when used as an inkjet ink, offers superior discharge characteristics, water resistance and adhesion.

A first aspect of the present invention relates to an aqueous pigment dispersion comprising a dispersion formed by dispersing a monoalkyl maleate graft polymer of a maleic anhydride/α-olefin copolymer in water in the presence of a base, a pigment, and an aqueous medium.

A second aspect of the present invention relates to an inkjet ink comprising a dispersion formed by dispersing a monoalkyl maleate graft polymer of a maleic anhydride/α-olefin copolymer in water in the presence of a base, a pigment, and an aqueous medium.

A third aspect of the present invention relates to a process for producing an aqueous pigment dispersion by dispersing a pigment in an aqueous medium in the presence of a dispersion formed by dispersing a monoalkyl maleate graft polymer of a maleic anhydride/α-olefin copolymer in water in the presence of a base.

The aqueous medium described above preferably comprises water and a glycol monoalkyl ether.

Furthermore, the number of carbon atoms in the α-olefin of the aforementioned maleic anhydride/α-olefin copolymer is preferably from 5 to 50.

Furthermore, the number of carbon atoms in the alkyl chain of the aforementioned monoalkyl maleate is preferably from 3 to 8.

In addition, the number average molecular weight of the graft polymer described above is preferably within a range from 1000 to 5000.

Furthermore, the acid value of the graft polymer is preferably within a range from 50 to 300 (mgKOH/g).

In addition, the aqueous pigment dispersion described above preferably comprises from 5 to 100 parts by weight of the graft polymer, from 5 to 70 parts by weight of a glycol monoalkyl ether, and from 230 to 370 parts by weight of water, per 100 parts by weight of the pigment.

DETAILED DESCRIPTION OF THE INVENTION

A graft polymer used in the present invention is a water dispersion with a solid fraction of 10 to 20% by weight, produced by dispersing a monoalkyl maleate graft polymer of a maleic anhydride/α-olefin copolymer in water in the presence of a base, and is prepared in accordance with the properties of the present invention, by conducting a polymerization using known methods, adding the polymer to water together with a base, and then stirring and dispersing the mixture in a high speed mixer or homogenizer while heating to a temperature of at least 60° C., and preferably a temperature within a range from 60 to 70° C.

Examples of suitable bases that can be used during the dispersion of the graft polymer in water include ammonia, triethylamine, triethanolamine, dimethylaminoethanol, diethylaminoethanol, sodium hydroxide and potassium hydroxide.

The amount of base added should be adjusted in accordance with the desired pH for the final aqueous pigment dispersion, and whether or not the dispersion is to be used as an inkjet ink. In other words, sufficient base may be added to ensure adequate neutralization of the graft polymer, as indicated by the acid value, or alternatively, the graft polymer may be only partially neutralized.

There are no particular restrictions on the glycol monoalkyl ether used in the present invention, provided the ether can be mixed with water in an arbitrary ratio. Specific examples of suitable glycol monoalkyl ethers include diethylene glycol mono-n-butyl ether, triethylene glycol mono-n-butyl ether, diethylene glycol monomethyl ether and diethylene glycol monoethyl ether.

The number of carbon atoms within the α-olefin used to form the graft polymer is preferably from 5 to 50, although α-olefins of 10 to 30 carbon atoms are even more desirable. If the number of carbon atoms is less than 5, adsorption to the pigment is weak during dispersion of the pigment, whereas if the number of carbon atoms exceeds 50, the hydrophilicity of the copolymer deteriorates, making it unsuitable as an aqueous pigment dispersant. Furthermore, if the dispersion is used as an inkjet ink, then α-olefins with fewer than 5 carbon atoms do not generate the desired level of water resistance and adhesion for the printed product, whereas α-olefins of more than 50 carbon atoms result in a decrease in solubility of the graft polymer in water, which can cause precipitation within the ink. In the present invention, a mixture of two or more different α-olefins with differing numbers of carbon atoms may also be used.

The number of carbon atoms in the alkyl chain of the monoalkyl maleate used to form the graft polymer is preferably from 3 to 8, and specific examples of this alkyl chain include n-propyl, isopropyl, n-butyl, isobutyl, tert-butyl and 2-ethylhexyl chains.

The number average molecular weight of the graft polymer is preferably within a range from 1000 to 5000, and even more preferably from 2000 to 3000. If the number average molecular weight is less than 1000, the dispersibility of the pigment is poor, and if the dispersion is used as an inkjet ink, the adhesion to the recording medium deteriorates. In contrast, if the number average molecular weight exceeds 5000, the viscosity of the product aqueous pigment dispersion increases undesirably, which when the dispersion is used as an inkjet ink, can cause a deterioration in the ink jetability, including blockage of the discharge nozzles.

The acid value of the graft polymer is preferably within a range from 50 to 300 (mgKOH/g), and even more preferably from 100 to 200 (mgKOH/g). If the acid value is less than 50, the solubility in water decreases markedly, making the polymer unsuitable as an aqueous pigment dispersant, and if the dispersion is used as an inkjet ink, precipitation can occur within the ink. In contrast, if the acid value exceeds 300, although the dispersibility of the pigment is good, if the dispersion is used as an inkjet ink, the water resistance of the recorded product deteriorates.

The amounts of each of the components used during dispersion of the pigment within the aqueous medium are preferably from 5 to 100 parts by weight of the graft polymer, from 5 to 70 parts by weight of the glycol monoalkyl ether, and from 230 to 370 parts by weight of water, per 100 parts by weight of the pigment. Amounts from 15 to 50 parts by weight for the graft polymer, from 10 to 40 parts by weight for the glycol monoalkyl ether, and from 290 to 360 parts by weight of water, per 100 parts by weight of the pigment are even more desirable. If the amount of the graft polymer is less than 5 parts by weight, the storage stability of the product aqueous pigment dispersion is poor, whereas if the amount exceeds 100 parts by weight, the viscosity of the aqueous pigment dispersion increases undesirably, which when the dispersion is used as an inkjet ink, can cause a deterioration in the ink jetability, including blockage of the discharge nozzles. Furthermore, the glycol monoalkyl ether is used to control the solubility of the graft polymer in water, and accordingly, if the amount of the glycol monoalkyl ether is less than 5 parts by weight, the solubility of the graft polymer in water is minimal, resulting in a decrease in dispersibility. In contrast, if the amount of the glycol monoalkyl ether exceeds 70 parts by weight, although a good dispersion can be achieved, if the dispersion is then used as an inkjet ink, the amount of other additives that can be added to the dispersion during preparation of the ink is limited, which is undesirable.

In an ink composition, the amount of the graft polymer is preferably within a range from 0.1 to 5% by weight, and the amount of the glycol monoalkyl ether is preferably within a range from 0.5 to 15% by weight. Amounts from 0.3 to 2% by weight for the graft polymer and from 1 to 10% by weight for the glycol monoalkyl ether are even more desirable. If the graft polymer content of an ink is less than 0.1% by weight, the water resistance and adhesion of the recorded product are unsatisfactory, whereas if the content exceeds 5% by weight, the jetability of the ink deteriorate, causing solidification on the surface of the nozzles. The glycol monoalkyl ether is used to control the solubility of the graft polymer in water, and lowers the surface tension of the ink, improving the wetting of both the liquid contact sections of the printer, and the recording medium. If the glycol monoalkyl ether content of an ink is less than 0.5% by weight, then both the solubility of the graft polymer in water and the wetting of the liquid contact sections of the printer deteriorate, which exhibits a deleterious effect on the discharge characteristics, whereas if the content exceeds 15% by weight, the water resistance and adhesion of the recorded product are unsatisfactory.

The graft polymer and the glycol monoalkyl ether used in the present invention may be added during the mixing of a pre-prepared aqueous pigment dispersion with ion exchange water, water soluble solvents, and surfactants and the like during the production of an inkjet ink, or alternatively, may be added during the dispersion of the pigment with similar effects.

The pigments used in the present invention can utilize any of the variety of pigments used in printing inks and paints and the like. Examples of these pigments, expressed in terms of color index values, include pigment black 7, pigment blue 15, 15:1, 15:3, 15:4, 15:6, pigment green 7, 36, pigment red 9, 48, 49, 52, 53, 57, 97, 122, 149, 168, 206, 207, 209, pigment violet 19, 23, 29, 30, 37, 40, 50, pigment yellow 12, 13, 14, 17, 20, 24, 74, 83, 86, 93, 94, 95, 109, 110, 117, 125, 128, 137, 138, 147, 148, 150, 151, 154, 166, 168, 180, and pigment orange 36, 43, 51, 55, 59, 61, 74. Furthermore, all forms of carbon black, including neutral, acidic, and basic forms of carbon black can also be used. These pigments are added to inks within a concentration range from 2 to 10% by weight.

In order to prevent drying within the nozzle sections and ink solidification, and ensure a more stable ink discharge, water soluble solvents that function as moisture retention agents may also be added to an aqueous inkjet ink of the present invention.

Examples of suitable water soluble solvents that function as moisture retention agents include 1,3-propanediol, 1,2-hexanediol, ethylene glycol, diethylene glycol, triethylene glycol, tetraethylene glycol, polyethylene glycol, dipropylene glycol, 2,4,6-hexanetriol, glycerin, tetrafurfuryl alcohol, ketone alcohol, N-methyl-2-pyrrolidone, 2-pyrrolidone, and 4-methoxy-4-methylpentanone. These water soluble solvents may be used singularly, or in mixtures, and typically account for 1 to 50% by weight, and preferably from 10 to 40% by weight of the ink.

Furthermore, in order to adjust the surface tension, and improve both the wetting of the liquid contact sections of the printer, and the stability of the ink discharge, nonionic, anionic, cationic or amphoteric surfactants can also be added to an aqueous inkjet ink of the present invention.

Examples of suitable nonionic surfactants include polyoxyethylene alkyl ethers, polyoxyethylene alkylaryl ethers, polyoxyethylene oxypropylene block copolymers, sorbitan fatty acid esters, polyoxyethylene sorbitan fatty acid esters, polyoxyethylene sorbitol fatty acid esters, glycerin fatty acid esters, polyoxyethylene fatty acid esters, polyoxyethylene alkylamines, as well as fluorine based and silicone based nonionic surfactants.

Examples of suitable anionic surfactants include salts of fatty acids, alkyl sulfates, alkylaryl sulfonates, alkylnaphthalene sulfonates, dialkyl sulfonates, dialkyl sulfosuccinates, alkyl diaryl ether disulfonates, alkyl phosphates, polyoxyethylene alkyl ether sulfates, polyoxyethylene alkylaryl ether sulfates, naphthalenesulfonic acid formalin condensate, polyoxyethylene alkyl phosphates, glycerol borate fatty acid esters, and polyoxyethylene glycerol fatty acid esters.

Examples of suitable cationic surfactants include alkylamine salts, quaternary ammonium salts, alkylpyridinium salts, and alkylimidazolium salts.

Examples of suitable amphoteric surfactants include alkylbetaines, alkylamine oxides, and phosphatidyl coline.

Of the surfactants listed above, anionic surfactants such as sodium lauryl sulfate, sodium dodecylbenzene sulfonate, sodium oleate, and sodium dioctyl sulfosuccinate also function as penetrants, accelerating the penetration of the ink into printing media that show permeability, and shortening the apparent drying time. These types of anionic surfactants that also function as penetrants should preferably account for 0.1 to 5% by weight of the ink. These anionic surfactants that also function as penetrants show an adequate effect when used in the amount that falls within the above range, but if the amount exceeds the upper limit of the above range, undesirable bleeding or print-through can occur within the printed image.

Furthermore, a variety of other additives such as biocides, preservatives, and chelating agents can also be added to an aqueous inkjet ink of the present invention.

Biocides and preservatives are added to prevent the occurrence of mold and decomposition within the ink, and suitable examples include sodium dehydroacetate, sodium benzoate, sodium pyridinethione-1-oxide, zinc pyridinethione-1-oxide, 1,2-benzisothiazolin-3-one and amine salts of 1,2-benzisothiazolin-3-one. The amount of these additives is preferably within a range from 0.01 to 2.0% by weight of the ink.

Chelating agents block metal ions within the ink, preventing the precipitation of metals within the nozzle sections and the precipitation of other insoluble matter within the ink. Examples of suitable chelating agents include ethylenediaminetetraacetic acid, the sodium salt of ethylenediaminetetraacetic acid, the diammonium salt of ethylenediaminetetraacetic acid, and the tetraammonium salt of ethylenediaminetetraacetic acid. These chelating agents are preferably used within a range from 0.005 to 0.5% by weight of the ink.

In order to adjust the pH of the ink, stabilize the ink, and ensure good stability between the ink and the liquid contact sections of the printer, pH adjusters such as amines, inorganic salts or ammonia, and buffer solutions such as phosphoric acid can also be added to the ink.

Anti-foaming agents may also be added to prevent the occurrence of foaming when the ink is circulated, delivered or produced.

Production of an aqueous pigment dispersion or an inkjet ink according to the present invention is conducted by dispersing the pigment, the graft polymer, and the aqueous medium using a dispersion device such as a high speed mixer, a paint shaker, a sand mill or a ball mill. Furthermore, by using a centrifuge or the like to remove any coarse particles from the dispersed aqueous pigment dispersion or inkjet ink, an aqueous pigment dispersion with excellent storage stability can be produced.

An aqueous inkjet ink of the present invention is preferably then filtered carefully through a filter with a pore size of no more than 0.65 µm, and even more preferably no more than 0.45 µm.

The present invention is able to provide an aqueous pigment dispersion that shows excellent dispersibility and storage stability. Furthermore, the present invention can also provide an aqueous inkjet ink that shows excellent storage stability, discharge characteristics, water resistance, and adhesion. In addition, the present invention can also provide a process for producing an aqueous pigment dispersion for use as an inkjet ink that shows excellent dispersibility and storage stability, as well as superior discharge characteristics, water resistance and adhesion.

EXAMPLES

As follows is a more specific description of the present invention based on a series of examples, although the present invention is in no way restricted to the examples presented below. In the examples, the units "parts" refer to "parts by weight".

Graft polymers according to the present invention were prepared by adding the compounds shown in Table 1, together with the base shown in Table 1, to ion exchange water, and then stirring the mixture for 1 hour in a high speed mixer while heating at 70° C., thereby yielding water dispersions of the graft polymers. In the table, the compositions of the graft polymers are expressed as molar ratios.

TABLE 1

| Water dispersions of synthesized graft polymers | | | | | |
|---|---|---|---|---|---|
| | Polymer A | Polymer B | Polymer C | Polymer D | Polymer E |
| Maleic anhydride | 40 parts | 45 parts | 42 parts | 35 parts | 37 parts |
| α-olefin | 40 parts | 45 parts | 42 parts | 35 parts | 37 parts |
| Monoalkyl maleate | 20 parts | 10 parts | 16 parts | 30 parts | 26 parts |
| Number of carbon atoms in α-olefin | 14 | 14, 18 | 14 | 14, 21 | 18 |
| Number of carbon atoms in alkyl chain | 3 | 3 | 4 | 3 | 4 |
| Number average molecular weight (Mn) | 2600 | 2100 | 2400 | 2500 | 2900 |
| Acid value (mgKOH/g) | 150 | 105 | 130 | 180 | 163 |
| Base | DMAE | DEAE | NaOH | TEA | DMAE |
| Solid fraction of dispersion | 15% | 17% | 16% | 15% | 13% |
| Dispersion pH | 9.2 | 9.5 | 8.3 | 8.8 | 9.2 |

DMAE: dimethylaminoethanol
DEAE: diethylaminoethanol
TEA: triethylamine

Example 1

75 parts of Printex 85 (carbon black, manufactured by Degussa AG), 166 parts of the water dispersion of the graft polymer A, 12 parts of diethylene glycol mono-n-butyl ether, 1 part of Proxel GXL (a biocide, manufactured by Avecia Ltd.), and 121 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was mixed in a high speed mixer with a diluent prepared in the manner described below, in a ratio of 20 parts of the aqueous pigment dispersion to 80 parts of the diluent, and was then filtered sequentially through membrane filters of 1 μm and 0.45 μm respectively, yielding an inkjet ink.

(Diluent)

| Glycerin | 10 parts |
|---|---|
| 1,3-propanediol | 15 parts |
| Newcol 291GL (an anionic surfactant, manufactured by Nippon Nyukazai Co., Ltd.) | 4 parts |
| Proxel GXL (a biocide, manufactured by Avecia Ltd.) | 0.2 parts |
| Ion exchange water | 70.8 parts |

Example 2

80 parts of Lionol Blue FG-7351 (a β-type copper phthalocyanine pigment, manufactured by Toyo Ink Manufacturing Co., Ltd.), 117 parts of the water dispersion of the graft polymer B, 15 parts of triethylene glycol mono-n-butyl ether, 1 part of Proxel GXL (a biocide, manufactured by Avecia Ltd.), and 187 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Example 3

80 parts of Hostaperm Pink E (a dimethylquinacridone pigment, manufactured by Clariant Ltd.), 156 parts of the water dispersion of the graft polymer C, 12 parts of diethylene glycol monoethyl ether, 1 part of Proxel GXL (a biocide, manufactured by Avecia Ltd.), and 151 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Example 4

70 parts of Lionogen Yellow 1010 (a quinophthalone pigment, manufactured by Toyo Ink Manufacturing Co., Ltd.), 200 parts of the water dispersion of the graft polymer D, 15 parts of diethylene glycol mono-n-butyl ether, 1 part of Proxel GXL (a biocide, manufactured by Avecia Ltd.), and 64 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Example 5

75 parts of Novoperm Yellow P-HG (a benzimidazolone pigment, manufactured by Clariant Ltd.), 192 parts of the water dispersion of the graft polymer E, 11 parts of diethylene glycol monoethyl ether, 1 part of Proxel GXL (a biocide, manufactured by Avecia Ltd.), and 96 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Example 6

80 parts of Lionogen Magenta 5750 (a dimethylquinacridone pigment, manufactured by Toyo Ink Manufacturing Co., Ltd.), 167 parts of the water dispersion of the graft polymer A, 12 parts of diethylene glycol mono-n-butyl ether, 1 part of Proxel GXL (a biocide, manufactured by Avecia Ltd.), and 140 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Comparative Example 1

75 parts of Printex 85 (carbon black, manufactured by Degussa AG), 100 parts of T-Coat BCX4130 (an aqueous acrylic resin, manufactured by Toyo Ink Manufacturing Co., Ltd.), 1 part of Proxel GXL (a biocide, manufactured by Avecia Ltd.), and 199 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Comparative Example 2

80 parts of Lionol Blue FG-7351 (a β-type copper phthalocyanine pigment, manufactured by Toyo Ink Manufacturing Co., Ltd.), 20 parts of Emulgen 420 (a surfactant, manufactured by Kao Corporation), 1 part of Proxel GXL (a biocide, manufactured by Avecia Ltd.), and 299 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

Comparative Example 3

80 parts of Hostaperm Pink E (a dimethylquinacridone pigment, manufactured by Clariant Ltd.), 30 parts of Joncryl 62 (an aqueous styrene-acrylic resin, manufactured by Johnson Polymer Ltd.), 1 part of Proxel GXL (a biocide, manufactured by Avecia Ltd.), and 289 parts of ion exchange water were mixed together in a high speed mixer until a uniform mixture was obtained. Using a horizontal sand mill of capacity 0.6 L, this mixture was then dispersed for 1 hour for each 1 kg of mill base, yielding an aqueous pigment dispersion. In addition, a sample of this aqueous pigment dispersion was combined with a diluent in the same manner as the example 1, and was then filtered sequentially through membrane filters of 1 μm and 0.45 μm respectively, yielding an inkjet ink.

The aqueous pigment dispersions produced in the examples 1 to 6 and the comparative examples 1 to 3 were evaluated under the following categories: (1) dispersed particle size, (2) viscosity, and (3) storage stability. Furthermore, the inkjet inks prepared by mixing each of the aqueous pigment dispersions with the diluent were evaluated under the following categories: (4) dispersed particle size, (5) viscosity, (6) storage stability, (7) jetability, (8) water resistance, and (9) adhesion. The methods used for measuring each of these properties are described below.

(1) Dispersed Particle Size: The aqueous pigment dispersion was diluted 1000 fold with ion exchange water, and the volume referenced D50 and D99 values were measured using a Microtrac UPA150 (a wet type particle size analyzer, manufactured by Nikkiso Co., Ltd.).

(2) Viscosity: The aqueous pigment dispersion was adjusted to a temperature of 25° C., and the viscosity was measured using a Viscomate VM-100A (an ultrasound vibration viscometer, manufactured by Yamaichi Electronics Co., Ltd.).

(3) Storage Stability: The aqueous pigment dispersion was placed in a polypropylene bottle and stored for 1 month in a 70° C. thermostatic chamber to accelerate any changes, and the variation in viscosity of the aqueous pigment dispersion over the 1 month period was measured. These viscosity measurements were conducted in the same manner as the viscosity measurements described in (2) above.

(4) Dispersed Particle Size: The inkjet ink was diluted 200 fold with ion exchange water, and the volume referenced D50 and D99 values were measured using a Microtrac UPA150 (a wet type particle size analyzer, manufactured by Nikkiso Co., Ltd.).

(5) Viscosity: The inkjet ink was adjusted to a temperature of 25° C., and the viscosity was measured using a Viscomate VM-100A (an ultrasound vibration viscometer, manufactured by Yamaichi Electronics Co., Ltd.).

(6) Storage Stability: The inkjet ink was placed in a polypropylene bottle and stored for 1 month in a 70° C. thermostatic chamber to accelerate any changes, and the variation in viscosity of the inkjet ink over the 1 month period was measured. These viscosity measurements were conducted in the same manner as the viscosity measurements described in (5) above.

(7) Jetability: The inkjet ink was printed onto digital proof paper (DPP-G-914, manufactured by Roland DG Corporation) in a 5 m continuous print recording, using a HI-FL JET Pro FJ-400 printer (a wide format inkjet printer, manufactured by Roland DG Corporation), and the printed image was inspected for missing dots. The number of nozzles that produced missing dots was calculated as a percentage of the total number of nozzles, and the jetability were then evaluated as good (A) for a result of 0%, fair (B) for a result of above 0 to 5%, and poor (C) for a result of 5% or greater.

(8) Water Resistance: The inkjet ink was printed onto normal photocopy paper (4024, manufactured by Xerox Corporation) using a HI-FL JET Pro FJ-400 printer (a wide format inkjet printer, manufactured by Roland DG Corporation), and after standing for a fixed period at an air temperature of 25° C. and a humidity level of 50%, the printed image was immersed in tap water, and the degree of bleeding of the image was observed. Inkjet inks for which the printed image did not bleed even on immersion immediately after printing were evaluated as good (A), inkjet inks for which the printed image bled on immersion immediately after printing but did not bleed on immersion after standing for 1 hour were evaluated as fair (B), and inkjet inks for which the printed image bled on immersion even after standing for 1 hour were evaluated as poor (C).

(9) Adhesion: The inkjet ink was printed onto glossy PET film (PET-G-1050, manufactured by Roland DG Corporation) using a HI-FL JET Pro FJ-400 printer (a wide format inkjet printer, manufactured by Roland DG Corporation), and after standing for a fixed period at an air temperature of 25° C. and a humidity level of 50%, the adhesion of the ink within the printed image to the glossy PET film was evaluated using a rubbing tester (model AB301, manufactured by Tester Sangyo Co., Ltd.). The rubbing test involved rubbing a test cloth (formed from a kanakin No. 3 cotton fabric) 100 times back and forth over the printed image with a loading of 200 g. Inkjet inks for which no sections of the printed image were rubbed off even when rubbing was conducted 1 hour after the completion of printing were evaluated as good (A), inkjet inks for which sections of the printed image were rubbed off when rubbing was conducted 1 hour after the completion of printing, but for which no sections of the printed image were rubbed off when rubbing was conducted 24 hours after the completion of printing were evaluated as fair (B), and inkjet inks for which sections of the printed image were rubbed off even when rubbing was conducted 24 hours after the completion of printing were evaluated as poor (C).

The evaluation results for the aqueous pigment dispersions are shown in Table 2, and the evaluation results for the inkjet inks are shown in Table 3.

TABLE 2

Evaluation results for aqueous pigment dispersions

| | Dispersed particle size (nm) | | Viscosity (mPa · s) | |
|---|---|---|---|---|
| | D50 | D99 | Initial | After 1 month at 70° C. |
| Example 1 | 80 | 270 | 3.3 | 3.4 |
| Example 2 | 109 | 310 | 3.8 | 3.6 |
| Example 3 | 124 | 389 | 3.2 | 3.6 |
| Example 4 | 90 | 267 | 3.6 | 3.4 |
| Example 5 | 150 | 378 | 3.1 | 3.1 |
| Example 6 | 85 | 237 | 3.8 | 3.7 |
| Comparative example 1 | 120 | 890 | 10.7 | 32.9 |
| Comparative example 2 | 180 | 677 | 6.3 | 14.3 |
| Compaiative example 3 | 220 | 1150 | 7.2 | 22.9 |

From Table 2 it is evident that, compared with the comparative examples 1 to 3, all of the aqueous pigment dispersions of the examples 1 to 6 displayed a smaller dispersed particle size, a lower viscosity, and a smaller variation in viscosity after standing for 1 month at 70° C., indicating superior levels of dispersibility and storage stability.

From Table 3 it is evident that, compared with the comparative examples 1 to 3, when the inkjet inks of the examples 1 to 6 were prepared by diluting the aqueous pigment dispersions, the small dispersed particle size was retained, the variation in viscosity after standing for 1 month at 70° C. was smaller, and the stability of the diluted product and the storage stability of the ink were excellent. Furthermore, whereas the printing suitability evaluations for the examples 1 to 6 were good for all the evaluation categories, none of the comparative examples 1 to 3 displayed satisfactory printing suitability.

Example 7

32.3 parts of Liojet Yellow Base (an aqueous pigment dispersion, manufactured by Toyo Ink Manufacturing Co., Ltd.), 6.7 parts of the water dispersion of the graft polymer A, 5 parts of diethylene glycol mono-n-butyl ether, 10 parts of glycerin, 20 parts of 1,3-propanediol, 2 parts of Newcol 291GL (a surfactant, manufactured by Nippon Nyukazai Co., Ltd.), 0.2 parts of Proxel GXL (a biocide, manufactured by Avecia Ltd.), and 23.8 parts of ion exchange water were mixed together in a high speed mixer, and then filtered sequentially through membrane filters of 1 μm and 0.45 μm respectively, yielding an aqueous inkjet ink.

Example 8

80 parts of Lionogen Yellow 1010 (a quinophthalone pigment, manufactured by Toyo Ink Manufacturing Co., Ltd.), 133 parts of the water dispersion of the graft polymer A, 12 parts of diethylene glycol mono-n-butyl ether, and 175 parts of ion exchange water were mixed together in a high speed mixer until a uniform mixture was obtained, and then dispersed for 3 hours in a horizontal sand mill, yielding an aqueous pigment dispersion A. Subsequently, 25 parts of this

TABLE 3

Evaluation results for aqueous inkjet inks

| | Dispersed particle size (nm) | | Viscosity (mPa · s) | | | Water | |
|---|---|---|---|---|---|---|---|
| | D50 | D99 | Initial | After 1 month at 70° C. | Jetability | resistance | Adhesion |
| Example 1 | 78 | 290 | 3.9 | 3.8 | A | A | A |
| Example 2 | 115 | 332 | 3.9 | 3.9 | A | A | A |
| Example 3 | 121 | 360 | 3.7 | 3.8 | A | A | A |
| Example 4 | 86 | 289 | 3.9 | 3.7 | A | A | A |
| Example 5 | 143 | 390 | 3.6 | 3.7 | A | A | A |
| Example 6 | 91 | 277 | 4.1 | 4.2 | A | A | A |
| Comparative example 1 | 189 | 1022 | 14.8 | gelled | C | A | B |
| Comparative example 2 | 230 | 1350 | 4.8 | 24.9 | A | C | C |
| Comparative example 3 | 237 | 1230 | 13.1 | 18.5 | C | B | C | aqueous pigment dispersion A, 3 parts of diethylene glycol mono-n-butyl ether, 10 parts of glycerin, 20 parts of 1,3-propanediol, 2 parts of Newcol 291GL (a surfactant, manufactured by Nippon Nyukazai Co., Ltd.), 0.2 parts of Proxel GXL (a biocide, manufactured by Avecia Ltd.), and 39.8 parts of ion exchange water were mixed together in a high speed mixer, and then filtered sequentially through membrane filters of 1 µm and 0.45 µm respectively, yielding an aqueous inkjet ink.

Example 9

25 parts of Liojet Magenta Base (an aqueous pigment dispersion, manufactured by Toyo Ink Manufacturing Co., Ltd.), 5 parts of the water dispersion of the graft polymer B, 5 parts of triethylene glycol mono-n-butyl ether, 10 parts of glycerin, 20 parts of ethylene glycol, 1 part of Surfynol 485W (a surfactant, manufactured by Air Products and Chemicals, Inc.), 0.2 parts of Proxel GXL (a biocide, manufactured by Avecia Ltd.), and 33.8 parts of ion exchange water were mixed together in a high speed mixer, and then filtered sequentially through membrane filters of 1 µm and 0.45 µm respectively, yielding an aqueous inkjet ink.

Example 10

80 parts of Lionogen Magenta 5750 (a quinacridone pigment, manufactured by Toyo Ink Manufacturing Co., Ltd.), 115 parts of the water dispersion of the graft polymer B, 20 parts of triethylene glycol mono-n-butyl ether, and 185 parts of ion exchange water were mixed together in a high speed mixer until a uniform mixture was obtained, and then dispersed for 4 hours in a horizontal sand mill, yielding an aqueous pigment dispersion B. Subsequently, 20 parts of this aqueous pigment dispersion B, 2 parts of triethylene glycol mono-n-butyl ether, 10 parts of glycerin, 20 parts of ethylene glycol, 1 part of Surfynol 485W (a surfactant, manufactured by Air Products and Chemicals, Inc.), 0.2 parts of Proxel GXL (a biocide, manufactured by Avecia Ltd.), and 46.8 parts of ion exchange water were mixed together in a high speed mixer, and then filtered sequentially through membrane filters of 1 µm and 0.45 µm respectively, yielding an aqueous inkjet ink.

Example 11

21 parts of Liojet Cyan Base (an aqueous pigment dispersion, manufactured by Toyo Ink Manufacturing Co., Ltd.), 7 parts of the water dispersion of the graft polymer C, 5 parts of diethylene glycol monoethyl ether, 10 parts of glycerin, 15 parts of diethylene glycol, 2 parts of Newcol 291GL (a surfactant, manufactured by Nippon Nyukazai Co., Ltd.), 0.2 parts of Proxel GXL (a biocide, manufactured by Avecia Ltd.), and 39.8 parts of ion exchange water were mixed together in a high speed mixer, and then filtered sequentially through membrane filters of 1 µm and 0.45 µm respectively, yielding an aqueous inkjet ink.

Example 12

7.5 parts of Hostafine Blue B2G (an aqueous pigment dispersion, manufactured by Clariant Ltd.), 6.7 parts of the water dispersion of the graft polymer D, 5 parts of diethylene glycol monoethyl ether, 10 parts of glycerin, 15 parts of diethylene glycol, 2 parts of Newcol 291GL (a surfactant, manufactured by Nippon Nyukazai Co., Ltd.), 0.2 parts of Proxel GXL (a biocide, manufactured by Avecia Ltd.), and 53.6 parts of ion exchange water were mixed together in a high speed mixer, and then filtered sequentially through membrane filters of 1 µm and 0.45 µm respectively, yielding an aqueous inkjet ink.

Example 13

26 parts of Liojet Black Base (an aqueous pigment dispersion, manufactured by Toyo Ink Manufacturing Co., Ltd.), 10 parts of the water dispersion of the graft polymer E, 7 parts of diethylene glycol mono-n-butyl ether, 10 parts of glycerin, 20 parts of 1,3-propanediol, 1 part of Newcol B13 (a surfactant, manufactured by Nippon Nyukazai Co., Ltd.), 0.2 parts of Proxel GXL (a biocide, manufactured by Avecia Ltd.), and 25.8 parts of ion exchange water were mixed together in a high speed mixer, and then filtered sequentially through membrane filters of 1 µm and 0.45 µm respectively, yielding an aqueous inkjet ink.

Example 14

13 parts of Hostafine Black TS (an aqueous pigment dispersion, manufactured by Clariant Ltd.), 10 parts of the water dispersion of the graft polymer E, 7 parts of diethylene glycol mono-n-butyl ether, 10 parts of glycerin, 20 parts of 1,3-propanediol, 1 part of Newcol B13 (a surfactant, manufactured by Nippon Nyukazai Co., Ltd.), 0.2 parts of Proxel GXL (a biocide, manufactured by Avecia Ltd.), and 38.8 parts of ion exchange water were mixed together in a high speed mixer, and then filtered sequentially through membrane filters of 1 µm and 0.45 µm respectively, yielding an aqueous inkjet ink.

Comparative Example 4

32.3 parts of Liojet Yellow Base (an aqueous pigment dispersion, manufactured by Toyo Ink Manufacturing Co., Ltd.), 5 parts of diethylene glycol mono-n-butyl ether, 10 parts of glycerin, 20 parts of 1,3-propanediol, 2 parts of Newcol 291GL (a surfactant, manufactured by Nippon Nyukazai Co., Ltd.), 0.2 parts of Proxel GXL (a biocide, manufactured by Avecia Ltd.), and 30.5 parts of ion exchange water were mixed together in a high speed mixer, and then filtered sequentially through membrane filters of 1 µm and 0.45 µm respectively, yielding an aqueous inkjet ink.

Comparative Example 5

32.3 parts of Liojet Yellow Base (an aqueous pigment dispersion, manufactured by Toyo Ink Manufacturing Co., Ltd.), 5 parts of polyvinylpyrrolidone K-15 (manufactured by Tokyo Kasei Kogyo Co., Ltd.), 5 parts of diethylene glycol mono-n-butyl ether, 10 parts of glycerin, 20 parts of 1,3-propanediol, 2 parts of Newcol 291GL (a surfactant, manufactured by Nippon Nyukazai Co., Ltd.), 0.2 parts of Proxel GXL (a biocide, manufactured by Avecia Ltd.), and 25.5 parts of ion exchange water were mixed together in a high speed mixer, and then filtered sequentially through membrane filters of 1 µm and 0.45 µm respectively, yielding an aqueous inkjet ink.

Comparative Example 6

25 parts of Liojet Magenta Base (an aqueous pigment dispersion, manufactured by Toyo Ink Manufacturing Co., Ltd.), 10 parts of glycerin, 20 parts of ethylene glycol, 2 parts of Surfynol 485W (a surfactant, manufactured by Air Products and Chemicals, Inc.), 0.2 parts of Proxel GXL (a biocide, manufactured by Avecia Ltd.), and 42.8 parts of ion exchange water were mixed together in a high speed mixer, and then filtered sequentially through membrane filters of 1 µm and 0.45 µm respectively, yielding an aqueous inkjet ink.

Comparative Example 7

7.5 parts of Hostafine Blue B2G (an aqueous pigment dispersion, manufactured by Clariant Ltd.), 10 parts of glycerin, 15 parts of diethylene glycol, 2 parts of Newcol 291GL (a surfactant, manufactured by Nippon Nyukazai Co., Ltd.), 0.2 parts of Proxel GXL (a biocide, manufactured by Avecia Ltd.), and 65.3 parts of ion exchange water were mixed together in a high speed mixer, and then filtered sequentially through membrane filters of 1 µm and 0.45 µm respectively, yielding an aqueous inkjet ink.

Comparative Example 8

7.5 parts of Hostafine Blue B2G (an aqueous pigment dispersion, manufactured by Clariant Ltd.), 3 parts of Poval PVA103 (polyvinyl alcohol, manufactured by Kuraray Co., Ltd.), 5 parts of diethylene glycol monoethyl ether, 10 parts of glycerin, 15 parts of diethylene glycol, 2 parts of Newcol 291GL (a surfactant, manufactured by Nippon Nyukazai Co., Ltd.), 0.2 parts of Proxel GXL (a biocide, manufactured by Avecia Ltd.), and 57.3 parts of ion exchange water were mixed together in a high speed mixer, and then filtered sequentially through membrane filters of 1 µm and 0.45 µm respectively, yielding an aqueous inkjet ink.

Comparative Example 9

13 parts of Hostafine Black TS (an aqueous pigment dispersion, manufactured by Clariant Ltd.), 7 parts of diethylene glycol mono-n-butyl ether, 10 parts of glycerin, 20 parts of 1,3-propanediol, 1 part of Newcol B13 (a surfactant, manufactured by Nippon Nyukazai Co., Ltd.), 0.2 parts of Proxel GXL (a biocide, manufactured by Avecia Ltd.), and 48.8 parts of ion exchange water were mixed together in a high speed mixer, and then filtered sequentially through membrane filters of 1 µm and 0.45 µm respectively, yielding an aqueous inkjet ink.

The aqueous inkjet inks prepared in the examples 7 to 14 and the comparative examples 4 to 9 were evaluated under the following categories: (4) dispersed particle size, (5) viscosity, (6) storage stability, (7) jetability, (8) water resistance, and (9) adhesion. The methods used for measuring each of these properties are as described above.

The evaluation results are summarized below in Table 4.

TABLE 4

Evaluation results for aqueous inkjet inks

| | Dispersed particle size (nm) | | Viscosity (mPa · s) | | Jetability | Water resistance | Adhesion |
|---|---|---|---|---|---|---|---|
| | D50 | D99 | Initial | After 1 month at 70° C. | | | |
| Example 7 | 68 | 237 | 3.8 | 3.7 | A | A | A |
| Example 8 | 85 | 289 | 3.7 | 3.7 | A | A | A |
| Example 9 | 88 | 239 | 3.9 | 3.8 | A | A | A |
| Example 10 | 84 | 288 | 4.1 | 4.1 | A | A | A |
| Example 11 | 109 | 310 | 3.6 | 3.7 | A | A | A |
| Example 12 | 125 | 357 | 3.8 | 3.9 | A | A | A |
| Example 13 | 78 | 279 | 3.7 | 3.6 | A | A | A |
| Example 14 | 128 | 358 | 3.9 | 3.8 | A | A | A |
| Comparative example 4 | 71 | 240 | 3.3 | 3.1 | A | C | C |
| Comparative example 5 | 88 | 310 | 3.9 | 4.9 | B | B | C |
| Comparative example 6 | 83 | 288 | 3.5 | 3.4 | B | C | C |
| Comparative example 7 | 123 | 380 | 3.3 | 3.5 | B | C | C |
| Comparative example 8 | 129 | 395 | 3.7 | 4.8 | C | B | B |
| Comparative example 9 | 126 | 329 | 3.5 | 3.7 | A | C | C |

As is evident from Table 4, the aqueous inkjet inks of the examples 7 to 14 displayed small dispersed particle sizes, low viscosity, almost no variation in viscosity after standing for 1 month at 70° C., and excellent storage stability. Furthermore, the inks also satisfied all the evaluation standards for jetability, water resistance, and adhesion. In comparison, amongst the aqueous inkjet inks of the comparative examples 4 to 9, although some inks displayed comparatively good storage stability, in general the inkjet inks displayed poor suitability for printing, and none of the inks displayed a satisfactory level of water resistance or adhesion.

What is claimed is:

1. An aqueous pigment dispersion comprising a dispersion formed by dispersing a monoalkyl maleate graft polymer of a maleic anhydride/α-olefin copolymer in water in presence of a base, a pigment, and an aqueous medium, wherein said aqueous medium comprises water and a glycol monoalkyl ether,
wherein the monoalkyl maleate graft polymer of a maleic anhydride/α-olefin copolymer consists of a maleic anhydride portion, an α-olefin portion and a monoalkyl maleate portion.

2. The aqueous pigment dispersion according to claim 1, wherein a number of carbon atoms in said α-olefin of said maleic anhydride/α-olefin copolymer is from 5 to 50.

3. The aqueous pigment dispersion according to claim 1, wherein a number of carbon atoms in an alkyl chain of said monoalkyl maleate is from 3 to 8.

4. The aqueous pigment dispersion according to claim 1, wherein a number average molecular weight of said graft polymer is within a range from 1000 to 5000.

5. The aqueous pigment dispersion according to claim 1, wherein an acid value of said graft polymer is within a range from 50 to 300 (mgKOH/g).

6. The aqueous pigment dispersion according to claim 1, comprising from 5 to 100 parts by weight of said graft polymer, from 5 to 70 parts by weight of said glycol monoalkyl ether, and from 230 to 370 parts by weight of water, per 100 parts by weight of said pigment.

7. An inkjet ink comprising a dispersion formed by dispersing a monoallcyl maleate graft polymer of a maleic anhydride/α-olefin copolymer in water in presence of a base, a pigment, and an aqueous medium, wherein said aqueous medium comprises water and a glycol monoalkyl ether,
wherein the mono alkyl maleate graft polymer of a maleic anhydride/α-olefin copolymer consists of a maleic anhydride portion, an α-olefin portion and a monoalkyl maleate portion.

8. The inkjet ink according to claim 7, wherein a number of carbon atoms in said α-olefin of said maleic anhydride/α-olefin copolymer is from 5 to 50.

9. The inkjet ink according to claim 7, wherein a number of carbon atoms in an alkyl chain of said monoalkyl maleate is from 3 to 8.

10. The inkjet ink according to claim 7, wherein a number average molecular weight of said graft polymer is within a range from 1000 to 5000.

11. The inkjet ink according to claim 7, wherein an acid value of said graft polymer is within a range from 50 to 300 (mgKOH/g).

12. A process for producing an aqueous pigment dispersion by dispersing a pigment in an aqueous medium in presence of a dispersion formed by dispersing a monoalkyl maleate graft polymer of a maleic anhydride/α-olefin copolymer in water in presence of a base, wherein said aqueous medium comprises water and a glycol monoalkyl ether,
wherein the monoalkyl maleate graft polymer of the maleic anhydride/α-olefin copolymer consists of a maleic anhydride portion, an α-olefin portion and a monoalkyl maleate portion.

13. The process for producing an aqueous pigment dispersion according to claim 12, wherein a number of carbon atoms in said α-olefin of said maleic anhydride/α-olefin copolymer is from 5 to 50.

14. The process for producing an aqueous pigment dispersion according to claim 12, wherein a number of carbon atoms in an alkyl chain of said monoalkyl maleate is from 3 to 8.

15. The process for producing an aqueous pigment dispersion according to claim 12, wherein a number average molecular weight of said graft polymer is within a range from 1000 to 5000.

16. The process for producing an aqueous pigment dispersion according to claim 12, wherein an acid value of said graft polymer is within a range from 50 to 300 (mgKOH/g).

17. The process for producing an aqueous pigment dispersion according to claim 12, wherein said aqueous pigment dispersion comprises from 5 to 100 parts by weight of said graft polymer, from 5 to 70 parts by weight of said glycol monoalkyl ether, and from 230 to 370 parts by weight of water, per 100 parts by weight of said pigment.

* * * * *